US005139890A

United States Patent [19]

Cowie et al.

[11] Patent Number: 5,139,890

[45] Date of Patent: Aug. 18, 1992

[54] SILVER-COATED ELECTRICAL COMPONENTS

[75] Inventors: John G. Cowie, Bethany; George J. Muench; Julius Fister, both of Hamden, all of Conn.

[73] Assignee: Olin Corporation, New Haven, Conn.

[21] Appl. No.: 767,764

[22] Filed: Sep. 30, 1991

[51] Int. Cl.[5] ........................ B32B 15/20; H01H 1/02; H01R 4/58; H01R 13/03

[52] U.S. Cl. .................................... 428/670; 428/672; 428/673; 428/674; 428/675; 428/929; 439/886; 200/267; 200/269

[58] Field of Search ............... 428/673, 674, 676, 672, 428/671, 666, 670, 669, 929; 439/886, 887, 931; 200/267, 268, 269, 266

[56] References Cited

U.S. PATENT DOCUMENTS

| | | | |
|---|---|---|---|
| 1,738,828 | 12/1929 | Jackson | 428/672 |
| 1,904,241 | 4/1933 | Kammeren | 200/269 |
| 2,694,759 | 11/1954 | Thumim | 428/672 |
| 2,897,584 | 8/1959 | Schumpelt | 428/672 |
| 3,648,355 | 3/1972 | Shuda et al. | 428/673 |
| 3,735,079 | 5/1973 | Dieberich | 200/267 |
| 3,778,237 | 12/1973 | Shapiro et al. | 428/673 |
| 4,189,204 | 2/1980 | Brown et al. | 439/846 |
| 4,314,848 | 2/1982 | Todoroki et al. | 428/673 |
| 4,315,299 | 2/1982 | Saint Marcoux | 361/274 |
| 4,387,279 | 9/1983 | Brevick | 200/61.54 |
| 4,529,667 | 7/1985 | Shiga et al. | 428/673 |
| 4,749,626 | 6/1988 | Kadija et al. | 428/647 |
| 4,894,752 | 1/1990 | Murata et al. | 428/671 |

FOREIGN PATENT DOCUMENTS

| | | | |
|---|---|---|---|
| 103244 | 7/1936 | Australia | 200/267 |
| 53-139173 | 12/1978 | Japan | 428/673 |
| 59-5581 | 1/1984 | Japan | 428/673 |

OTHER PUBLICATIONS

H. B. Gibson, "Metal Coatings for Electrical Conductors", Product Engineering-Nov. 1956 pp. 191-193 .

"Power Connections-Silver plated on all contact surfaces", General Electric Review, Jul. 1951, p. 11.

Tummala et al., Microelectronics Packaging Handbook at Section 14.3.3 entitled "Connector and Cable Packaging-Material Properties", 1989 (pp. 974-979).

Metals Handbook, Tenth Edition, vol. 2, entitled "Properties and Selection: Nonferrous Alloys and Special-Purpose Materials" at p. 848, entitled "Precious Metal Overlays" (1990).

Siepmann et al., entitled "Optimizing Contact Materials in Relays for Use in Specific Load-Cases of Automobiles" appearing in Thirty Third IEEE Holm Conference on Electrical Contacts, at pp. 213-220 (1987).

*Primary Examiner*—John Zimmerman

*Attorney, Agent, or Firm*—Gregory S. Rosenblatt; Paul Weinstein

[57] ABSTRACT

There has been provided an electrical component having resistance to oxidation and wear. The component has a copper or copper alloy substrate coated with a relatively thick layer of silver. A thin layer of gold may be deposited on the external surface of the silver coating layer to improve oxidation resistance, lubricity and to serve as a diffusion barrier.

12 Claims, No Drawings

SILVER-COATED ELECTRICAL COMPONENTS

FIELD OF THE INVENTION

This invention relates to silver coatings on electrical components. More particularly, a relatively thick layer of silver is deposited on a copper alloy component to improve both the electrical properties and oxidation resistance of the component.

BACKGROUND OF THE INVENTION

Electrical components for interconnection systems, such as contacts or relays, are usually manufactured from copper or a copper alloy for high electrical conductivity. A protective coating is usually used to prevent copper oxidation. Copper oxidation is detrimental since copper oxide will increase the contact resistance of the component. One widely used protective coating is gold. Tin and palladium alloys are also widely used. For example, palladium alloys for connector applications are disclosed in a paper by Lees et al, presented at the Twenty Third Annual Connector and Interconnection Technology Symposium and include palladium/25% by weight nickel and palladium/40% by weight silver. Ternary alloys such as palladium/40% silver/5% nickel are also utilized.

Silver coatings have also been used to improve conductivity and provide corrosion resistance as disclosed in U.S. Pat. No. 4,189,204 to Brown ®t al. The use of silver as a coating for connector contacts has been limited. Silver is characterized by poor sulfidation resistance and low hardness. However, silver has advantages over gold and a need exists for a reliable silver coating for electrical connector applications. Silver is comparatively inexpensive relative to gold and has high electrical conductivity. The metal is easily deposited by electrolytic means.

When silver has been used as a coating material, The coating was usually electrolytically deposited to a thicknesses of from about 1 to about 2.5 microns (about 40-1? microinches). Silver clads having a thickness in excess of about 25 microns have also been employed. These two thickness characteristics have generally been unacceptable because at the lower limits, the low hardness of silver leads to erosion to the base metal. At the higher thicknesses, both the weight and the cost of the silver become detrimental.

SUMMARY OF THE INVENTION

Accordingly, it is an object of the invention to provide a silver coating with sufficient resistance to sulfidation and to wear, that the coating is suitable for electrical contact/connector applications. It is a feature of the invention that a relatively thick layer of silver minimizes macrowear. Yet another feature of the invention is that the silver coating may be overcoated with a barrier layer to prevent tarnish. One such barrier layer is gold which provides tarnish resistance, lubricity and serves as a barrier to prevent copper migration to the surface of the coating.

An advantage of the coatings of the invention is that silver is cheaper than gold and more oxidation resistant than tin. The silver layer is readily deposited by electrolytic means, although cladding and other deposition techniques may also be employed. Yet another advantage is that good oxidation resistance at elevated temperatures is achieved. The resistance to both fretting wear and macrowear is well within the requirements for connector applications.

Still another advantage of the invention is that in high current applications, the thin tarnish layer formed by sulfidation does not detrimentally affect the electrical properties.

In accordance with the invention, there is provided an electrical component made up of a copper or copper alloy substrate and a silver coating layer having a thickness of from about 3.5 to about 20 microns. This coating is in direct contact with the substrate.

The above-stated objects, features and advantages of the present invention will become more obvious to one skilled in the art from the description which follows.

DETAILED DESCRIPTION OF THE PREFERRED EMBODIMENTS

The electrical connectors of the invention have a copper or a copper alloy substrate. The components typically are electrical connectors or contacts and may be exposed to elevated temperatures in a variety of atmospheres. One typical use is for electrical connectors under the hood of an automobile. Copper alloys which exhibit resistance to thermally induced softening are preferred. Such alloys include beryllium copper and copper nickel alloys such as copper alloy C7025 (nominal composition 3.0% by weight nickel, 0.6% silicon 0.1% magnesium and the balance copper). The copper alloy substrate is shaped into a desired electrical contact or relay and then coated with silver.

The silver coating is deposited by a means which will produce a coating with wear resistance. Wear resistance is necessary because if the silver coating erodes, the copper substrate is exposed to the atmosphere and copper oxide forms. Copper oxide has high electrical resistance and detrimentally affects the performance of the electrical component. The silver coating must further have good electrical conductivity. The electrical resistance both before and after thermal aging must be less than 10 milliohms and preferably less than 2 milliohms.

The inventors have discovered that a silver thickness in the range of from about 3.5 microns (140 micro inches) to about 20 microns (800 micro inches) will meet the above stated requirements. More preferably, the thickness of the silver coating layer is from about 4 microns to about 8 microns. Below about 3.5 microns, the connector is prone to macro wear failure due to repeated insertions and withdrawals. When the silver thickness exceeds about 20 microns, the soft coating readily deforms, which can cause mechanical adhesion between the connector and a terminal.

A barrier layer may be disposed between the silver coating and the copper alloy substrate. Typical barrier layers include nickel, iron and chromium. These materials have higher electrical resistance than silver and slightly increase the contact resistance. Also, depending on the diffusion barrier, the formability of the connector may be diminished.

Without the barrier, copper will more readily diffuse into the silver coating. If copper reaches the surface, oxidation occurs. However, the rate of diffusion is sufficiently slow that when the silver thickness exceeds about 3.5 microns, Applicants have not detected copper at the surface of the coating, even after 3000 hours at 150° C.

The silver layer may be deposited by any means known in the art such as cladding, electrolytic deposition, electroless deposition or vapor deposition. A most preferred means is electrolytic deposition from a cyanide silver bath.

While acceptable, an unprotected silver coating layer is not ideal. The silver reacts with sulfur in the air and tarnishes. The tarnish layer is sufficiently thin that relatively high currents, as used in automotive applications, pass through the connector and tarnish does not cause a problem. However, after long thermal exposures and with fretting wear, the electrical resistance of a connector with an unprotected silver layer rises above 10 milliohms.

The rise in resistance is eliminated by applying a flash of a barrier metal such as gold or palladium or an alloy thereof to the external surface of the silver layer. Gold is more preferred and provides at least three benefits:

(A). The gold minimizes tarnishing.

(B). The gold supplies lubricity, lowering the force necessary to remove a silver coated connector. Higher lubricity also leads to better fretting characteristics.

(C). The gold flash is a diffusion barrier further preventing copper atoms from diffusing to the surface and then oxidizing.

Gold is considerably more expensive than silver. It is desirable to limit the thickness of the gold flash to that effective to minimize tarnishing. Preferably, the flash is less than about 0.5 microns thick, More preferably, the thickness of the flash is from about 0.05 microns to about 0.1 microns. The gold may be deposited by any suitable means such as electrolytic, electroless or vapor deposition. Electrolytic deposition from a cyanide gold bath is most preferred.

The wear resistance of the silver coating layer may be further improved by increasing the hardness of the metal through the addition of an additive. Alloys of silver with titanium, zirconium, niobium, molybdenum, hafnium, tantalum, tungsten or mixtures thereof are all believed suitable. More preferred are niobium or zirconium.! The concentration of the alloying addition is that effective to increase hardness without unduly reducing the electrical conductivity of the coating layer. Preferably, the concentration of alloying addition is below about 10 atomic percent. Most preferred is a concentration of from about 1 to about 5 atomic percent.

The following Examples which are intended to be exemplary and not limiting, illustrate the advantages achieved by the connector system of the invention

EXAMPLE 1

Static contact resistance was measured in a accordance with ASTM Standard B667, using a gold probe under dry circuit conditions. The static contact resistance was measured for the as deposited coating and after thermal exposure at 150° C. in air for 500, 1000 and 3000 hours. As shown in Table I, an unprotected silver coating layer is effective for thermal exposures up to about 1000 hours. Above 1000 hours, the contact resistance of the coating becomes unacceptably high. With the inclusion of flash of gold over the silver, static contact resistance, even after thermal exposures in excess of 3000 hours, is well below 2 milliohms.

TABLE I

| Thickness (microns) | | Static Contact Resistance (milliohms) | | | |
|---|---|---|---|---|---|
| Ag | Au | 0 hr. | 500 hr. | 1000 hr. | 3000 hr. |
| 3.37 | — | 0.88 | 0.62 | 1.04 | 2.35 |
| 5.84 | — | — | 0.62 | 0.93 | 12.8 |
| 6.39 | — | — | 0.54 | 0.90 | 4.03 |

TABLE I-continued

| Thickness (microns) | | Static Contact Resistance (milliohms) | | | |
|---|---|---|---|---|---|
| Ag | Au | 0 hr. | 500 hr. | 1000 hr. | 3000 hr. |
| 7.43 | — | — | 0.70 | 0.74 | 4.78 |
| 3.57 | 0.1 | 0.52 | 0.48 | 0.52 | 0.586 |
| 8.06 | 0.1 | — | 0.47 | 0.47 | 1.68 |
| 10.78 | 1.02 | — | 0.47 | 0.55 | 0.67 |

EXAMPLE 2

To evaluate the fretting wear of the electrical connectors, a fretting wear apparatus was employed. The apparatus has an arm which wipes across the test sample. The distance of arm travel and applied load may both be specified. The moving arm simulates the miniscule vibrations which cause fretting corrosion in a contact assembly. A 50 gram load was applied for the fretting wear experiments. Thermal aging was again at 150° C. in air for times of up to 3000 hours. Electrical resistivity, was continuously monitored by computer and the data printout provided by a chart recorder. The gradual increase in resistance could be determined and the point of failure identified. Results are summarized in Table 2.

TABLE 2

| Thickness (microns) | | Static Contact Resistance (milliohms) After 5000 Fretting Cycles Aging Time (hours) | | | |
|---|---|---|---|---|---|
| Ag | Au | 0 | 500 | 1000 | 3000 |
| 3.37 | — | 1.40 | 0.86 | 1.29 | 6.41 |
| 5.84 | — | .35 | .35 | .34 | .33 |
| 6.34 | — | .33 | 1.05 | .35 | * |
| 7.43 | — | .33 | .55 | .35 | ** |
| 3.57 | 0.1 | 1.40 | 1.52 | .55 | .40 |
| 8.06 | 0.1 | .30 | .38 | .40 | .30 |
| 10.78 | 1.02 | .40 | .29 | .29 | .28 |

*static contact resistance exceeded 10 milliohms after 65 fretting cycles
**static contact resistance exceeded 10 milliohms after 555 fretting cycles.

While the invention has been described in terms of an electrical interconnection system and more specifically, in terms of electrical connectors, it is recognized that the silver coated copper alloys are suitable for other electrical interconnections systems, other electrical applications requiring low electrical resistance, good oxidation resistance and good resistance to wear, as well as other non-electrical applications.

The patents and publications cited herein are intended to be incorporated by reference in their entireties.

It is apparent that there has been provided in accordance with this invention silver coated copper alloys for electrical applications having oxidation-resistance and low electrical contact resistance which fully satisfies the objects, means and advantages set forth herein before. While the invention has been described in combination with specific embodiments and examples thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. An electrical component, comprising:

a copper or copper alloy substrate; and a coating layer having a thickness of from about 3.5 to about 20 microns contacting said substrate, said coating layer being an alloy of silver and at least one elemental addition selected from the group consisting of niobium and zirconium, said elemental addition being present in a concentration effective to increase the hardness of said alloy.

2. The electrical component of claim 1 wherein the thickness of said silver alloy coating layer is from about 4 to about 8 microns.

3. The electrical component of claim 1 wherein the concentration of said elemental addition is from that effective to increase hardness to about 10 atomic percent.

4. The electrical component of claim 13 wherein the concentration of said elemental addition is from about 1 to about 5 atomic percent.

5. The electrical component of claim 3 having a first barrier metal on the external surface of said silver alloy coating layer.

6. The electrical component of claim 5 wherein said first barrier metal is selected from the group consisting of gold, palladium and mixtures thereof.

7. The electrical component of claim 6 wherein said first barrier metal is gold having a thickness of from that effective to minimize tarnishing to about 0.15 microns.

8. The electrical component of claim 7 wherein the thickness of said first barrier metal is from about 0.05 to about 0.10 microns.

9. The electrical component of claim 7 wherein said silver alloy coating layer is in direct contact with said substrate.

10. The electrical component of claim 7 wherein a second barrier layer is disposed between said substrate and said silver alloy coating layer.

11. The electrical component of claim 10 wherein said second barrier layer is selected from the group consisting of nickel, iron and chromium.

12. The electrical component of claim 11 wherein said second barrier layer is nickel.

* * * * *

UNITED STATES PATENT AND TRADEMARK OFFICE

CERTIFICATE OF CORRECTION

PATENT NO. : 5,139,890

DATED : August 18, 1992

INVENTOR(S) : Cowie et al

It is certified that error appears in the above-indentified patent and that said Letters Patent is hereby corrected as shown below:

At column 5, line 16, please delete "13" and insert ---3--- in its place.

Signed and Sealed this

Fourteenth Day of September, 1993

Attest:

BRUCE LEHMAN

*Attesting Officer* *Commissioner of Patents and Trademarks*